UNITED STATES PATENT OFFICE.

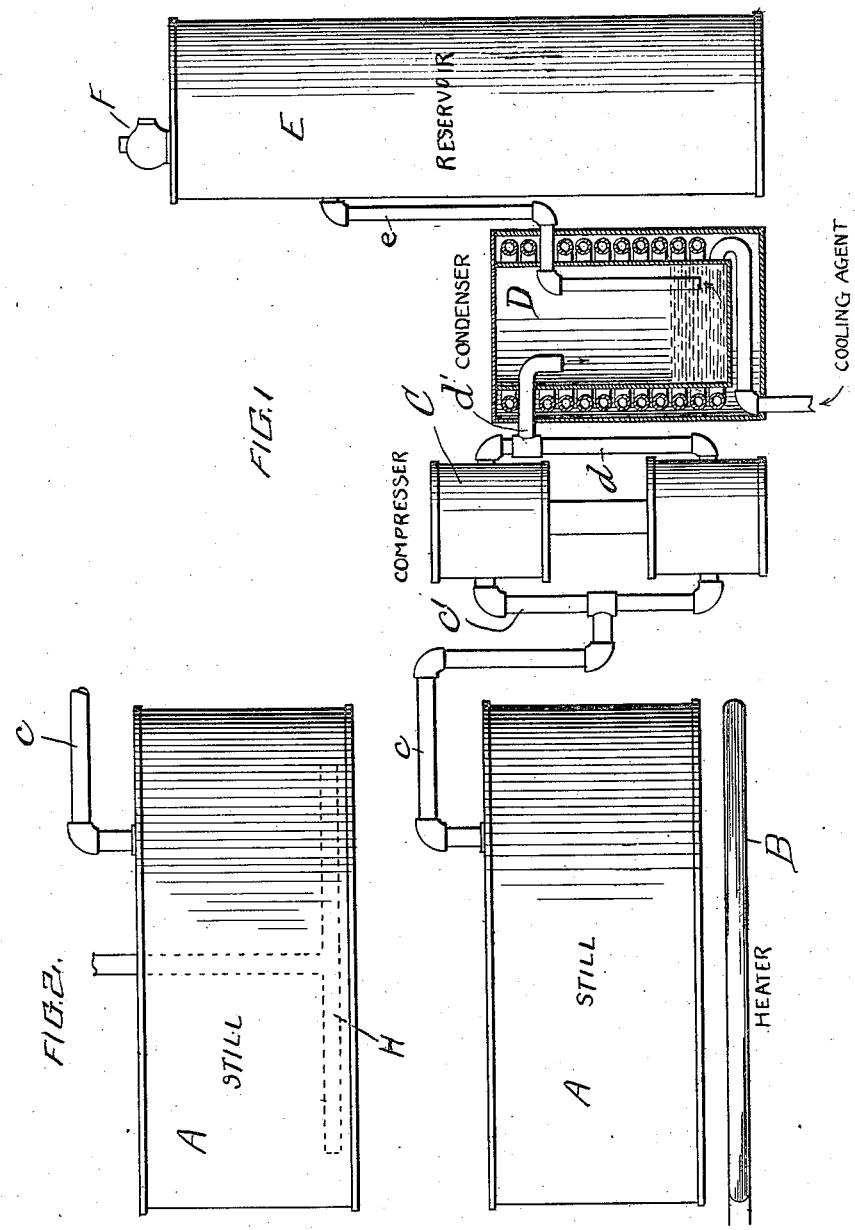

CHARLES R. BURKE, OF PITTSBURGH, PENNSYLVANIA, ASSIGNOR TO LULU P. BURKE, OF PITTSBURGH, PENNSYLVANIA.

PROCESS OF PRODUCING LIGHT HYDROCARBONS.

1,426,149. Specification of Letters Patent. Patented Aug. 15, 1922.

Application filed January 16, 1912. Serial No. 671,500.

*To all whom it may concern:*

Be it known that I, CHARLES R. BURKE, a citizen of the United States, residing at Pittsburgh, in the county of Allegheny and State of Pennsylvania, have invented certain new and useful Improvements in Processes of Producing Light Hydrocarbons; and I do hereby declare the following to be a full, clear, and exact description of the invention, such as will enable others skilled in the art to which it appertains to make and use the same.

My invention consists in certain new and useful improvements in the art of distillation and is a continuation in part of my prior application filed June 9, 1911, Serial No. 632,200 and for purposes of demonstration, I have illustrated, and hereinafter described, a process of distilling hydrocarbon oils, for the production of lighter hydrocarbons, which fully embodies my said invention.

The object of my invention is to provide a process whereby a substance, such for example as hydrocarbon oil, is broken up by distillation into vapors of variant specific gravity, then subjecting said vapors to pressure, which pressure may be varied, and then condensing the compressed vapors or vapor, the final product resulting from my process, being a stable compound, the specific gravity and character of which is determined by the amount of pressure applied to the vapors, in the compressor or condenser.

As heretofore suggested, in my present application for patent, I have described my process as applied to the treatment of hydrocarbon oils, and have illustrated one form of apparatus by which my invention may be carried into effect.

In my process as thus specifically applied, I obtain, by distillation from hydrocarbon oil, vapors of different specific gravity, and by pressure which I vary as desired, I combine such vapors into a vapor of a desired specific gravity, and I then condense such compressed vapor in any desired manner, the resultant product, being a hydrocarbon oil of a desired specific gravity, the specific gravity and character of the resultant product being regulated by the pressure applied to the distilled vapors.

In case the vapors have been subjected to pressure in the compressor, little or no pressure will be necessary in the condenser. If, however, the vapors reach the condenser without apparent pressure, the requisite amount of pressure is applied in the condenser.

It is to be observed that as gas and vapor are very closely related, I have for convenience, generally used the terms interchangeably in the specification and claims, except in places where I have desired to enumerate or specify definitely different substances.

By my improved process I accomplish a further object, which is to produce hydrocarbons of the lighter class, without the use of any substantial pressure in the still, and even when there may be a slight vacuum therein.

In order that my invention may be clearly understood, I have illustrated, in the accompanying drawings, one form of apparatus by which my process as applied to hydrocarbon oils may be carried out, although the same general form of apparatus may be used in the treatment of other substances.

In the drawings,

Fig. 1 is a diagrammatic view of a form of apparatus which I may employ.

Fig. 2 is a similar view of a modification of the still which forms a part of the apparatus.

Similar letters of reference indicate identical parts throughout.

A is a still of ordinary construction which may be formed of any desired material and is provided with a means B for heating its contents. C is a compressor, which I preferably heat in any desired manner to a temperature substantially the same as that of the vapors coming over from the still, and which may consist of a pump of any preferred construction. In this instance I use a pump of the double acting class, which is operated during the operation of my process, by an engine or other source of power, not shown.

The pump preferably acts to draw the vapors from the still, during the operation of distillation and also to compress the vapors and to force the compressed vapors into a condenser D through suitable pipes $c$, $c'$. The operation of the pump or compressor relieves the still of substantially all pressure, and may indeed create a partial vacuum therein, or reduce the pressure below normal and at the same time compress the vapors to a predetermined and desired extent, and forces the vapors into the condenser and increases the pressure therein, which assists in the operation of condensation.

D is a condenser of any desired character, and may be provided with cooling means of any suitable character, which acts to reduce the temperature of the condenser sufficiently to condense the compressed vapor. Any suitable means of condensing may, however, be employed. The condenser D is provided with suitable piping $d, d'$ which connects it with the compressor.

E is a reservoir for receiving the final product as it flows from the condenser through the pipe $e$. The reservoir is preferably provided with a safety valve F of usual form.

In carrying out my process, by the aid of the above described apparatus, the material to be distilled is placed in the still A and subjected to a desired degree of heat, when distillation will follow. The vapors resulting from this distillation are drawn through the pipes $c, c'$ into the compressor D and are then compressed under a pressure which may vary from ten to five hundred pounds or even more, the pressure used depending upon the desired specific gravity and character of the final condensed product.

From the compressor, the compressed vapor is preferably forced into the condenser, through the pipe $d'$ where it is condensed by ordinary means, as above set forth, such as coils of pipe, artificially chilled to a desired temperature, and thence the condensate is led to the reservoir E, when it is in condition to be used commercially.

The amount of pressure required to produce a desired product may, and frequently will, vary with the character of the original material charged in the still and hence it is sometimes desirable and often important to determine the amount of pressure to be used by a previous test of a small quantity of the original material used in charging the still.

It is within the scope of my invention to produce my resultant product either with or without the use of natural or other gas or air, with the heavy oil, and in Figure 2, I have shown a still arranged for introducing natural or other suitable gas, or atmospheric air. In this arrangement the dotted lines indicate piping H through which natural or other gas or air may be led into and discharged at the bottom of the still, the resultant vaporous material being drawn through the pipe $c$ and treated in the same manner as heretofore described.

In practice I have been able by my process, in the treatment of some materials, to vaporize all of the original contents of the still, and to change the entire original contents from a material of low specific gravity to a product of a desired specific gravity, and which depends upon the amount of pressure used upon the vaporous material resulting from distillation.

What I claim and desire to secure by Letters Patent is:—

1. The herein described process for producing a condensate of a predetermined specific gravity and character, from the distillation of a material producing vapors of varying specific gravity, which consists in vaporizing said material under pressure not exceeding atmospheric pressure, then subjecting the resultant vapors, to a predetermined increase of pressure, and then condensing the compressed vapors or vapor.

2. The herein described process for producing a condensate of a predetermined specific gravity and character, from the distillation of a material producing vapors of varying specific gravity, which consists in vaporizing said material, then subjecting the resultant vapors to a predetermined pressure, whereby they are reduced to a desired specific gravity, and then condensing the compressed vapor.

3. The herein described process for producing a condensate of a predetermined specific gravity and character, from the distillation of a material producing vapors of varying specific gravity, which consists in vaporizing said material, under a pressure not exceeding atmospheric pressure, then subjecting the resultant vapors to a predetermined pressure, whereby they are reduced to a desired specific gravity and then condensing the compressed vapor under the same pressure.

4. The process of producing light hydrocarbons from heavy hydrocarbon oil, which consists in distilling such heavy hydrocarbon oil, then compressing the resultant vapors and then condensing same, the specific gravity and character of the resultant product being determined by the pressure used in compressing the distilled vapors.

5. The process of producing light hydrocarbons from heavy hydrocarbon oil, which consists in distilling such heavy hydrocarbon oil without any substantial pressure in the still, then compressing the resultant vapors, and then condensing same, the specific gravity, and character of the resultant product being determined by the pressure used in compressing the distilled vapors.

6. The process of producing light hydrocarbons from heavy hydrocarbon oil, which consists in distilling such heavy hydrocarbon oil without any substantial pressure in the still, then compressing the resultant vapor, and then condensing the same under pressure.

7. The process of producing light hydrocarbons from heavy hydrocarbon oil, which consists in distilling such heavy hydrocarbon oil without any pressure in the still, then compressing the resultant vapor under a pressure from ten to five hundred pounds and then condensing the same under like pressure.

8. The process of producing light hydrocarbons from heavy hydrocarbon oil, which consists in distilling such heavy hydrocarbon oil without any substantial pressure in the still, passing the resultant vapor through a compressor where it is compressed, and passing the compressed vapor into a condenser and condensing same.

9. The process of producing light hydrocarbons from heavy hydrocarbon oil, which consists in mixing a suitable gas and such heavy hydrocarbon oil in a still, distilling the mixture without any substantial pressure in the still, then compressing the resultant vapor and then condensing the same under pressure.

10. The process of producing light hydrocarbons from heavy hydrocarbon oil, which consists in mixing a suitable gas and such heavy hydrocarbon oil in a still, distilling the mixture without any substantial pressure in the still, then compressing the resultant vapor and then condensing the same.

11. The herein described process for producing a condensate of a predetermined specific gravity and character, from the distillation of a material producing vapors of varying specific gravity which consists in vaporizing said material, then subjecting the resultant vapors, to a predetermined increase of pressure, and then condensing the compressed vapors or vapor.

12. The process of producing light hydrocarbons from heavy hydrocarbon oil, which consists in mixing a suitable gas and such heavy hydrocarbon oil in a still, distilling the mixture, then compressing the resultant vapor and then condensing the same under pressure.

13. The herein described process for producing a condensate of a predetermined specific gravity and character, from the distillation of a material producing vapors of varying specific gravity, which consists in vaporizing said material under a pressure not exceeding atmospheric pressure, then mixing with the same another material in gaseous form and subjecting the combined vapors and gaseous material to a predetermined pressure, whereby they are reduced to a desired specific gravity, and then condensing the compressate.

14. The herein described process for producing a condensate of a predetermined specific gravity and character from a material producing vapors of varying specific gravity, which consists in vaporizing said material, then subjecting the vapors to a pressure sufficient to heat and compress the same to the temperature and pressure of conversion.

15. The process of producing hydrocarbon oils having low boiling points from hydrocarbon oils having high boiling points which consists in preheating the oil to be treated and subjecting the material so treated in the presence of a vapor to a pressure sufficient to heat and compress the same to the temperature and pressure of conversion.

16. The process of producing hydrocarbon oils having low boiling points from hydrocarbon oils having high boiling points which consists in preheating at least a part of the material to be treated in one container, passing the material so treated including a vapor into a second container and subjecting the material within said second container to a pressure sufficient to heat and compress the same to the temperature and pressure of conversion.

17. The process of producing hydrocarbon oils having low boiling points from hydrocarbon oils having high boiling points which consists in subjecting the oil to be treated to the action of heat, and subjecting the material so treated including a vapor to a pressure sufficient to heat and compress the same to the temperature and pressure of conversion without the application of heat to the exterior of the container in which said pressure is applied to said material.

In testimony whereof I affix my signature, in the presence of two witnesses.

CHARLES R. BURKE.

Witnesses:
　CHAS. V. GRIFFITH,
　ROBT. J. COYLE, Jr.